United States Patent [19]
Zellweger

[11] Patent Number: 5,152,375
[45] Date of Patent: Oct. 6, 1992

[54] LIFTING MEANS FOR LABORATORY APPARATUS WITH STAND PROFILE AND BASE PEDESTAL AS WELL AS LABORATORY HEATING BATH, IN PARTICULAR FOR ROTARY EVAPORATORS

[76] Inventor: Adolf Zellweger, Bergweidstr. 3, 9202 Gossau, Switzerland

[21] Appl. No.: 278,949
[22] PCT Filed: Feb. 19, 1988
[86] PCT No.: PCT/CH88/00041
    § 371 Date: Oct. 24, 1988
    § 102(e) Date: Oct. 24, 1988
[87] PCT Pub. No.: WO88/06063
    PCT Pub. Date: Aug. 25, 1988

[30] Foreign Application Priority Data
Feb. 23, 1987 [CH] Switzerland .......... 676/87-1
Nov. 12, 1987 [CH] Switzerland .......... 4412/87

[51] Int. Cl.⁵ .......................................... B66B 11/04
[52] U.S. Cl. ................................. 187/21; 187/1 R
[58] Field of Search .............. 187/1 R, 20, 21, 42, 187/44, 95, 9 R

[56] References Cited

U.S. PATENT DOCUMENTS 3,957,137  5/1976  Vermette .............. 187/1 R
4,222,461  9/1980  Gunti ..................... 187/20

FOREIGN PATENT DOCUMENTS

0149972  7/1985  European Pat. Off. .
0156937 10/1985  European Pat. Off. .

Primary Examiner—H. Grant Skaggs
Assistant Examiner—Kenneth Noland
Attorney, Agent, or Firm—Ostrolenk, Faber, Gerb & Soffen

[57] ABSTRACT

A lifting device, including: a base pedestal; a stand located above the base pedestal; a carriage for lifting a laboratory apparatus; and lifting structure for lifting a carriage along the stand, the lifting structure including: a rotatable inertial mass located within the base pedestal; a movable actuating lever connected to the rotatable inertial mass for rotating the inertial mass; and connecting structure for operatively connecting the carriage to the rotatable inertial mass whereby the carriage can be lifted by rotating the rotatable inertial mass. The rotary evaporator is heated by a system including: a bath; a base pedestal for supporting the bath; handles for lifting the system; and a holder for holding a heater and for holding structure for controlling the heater. The rotary evaporator is rotated by a system including: a base pedestal for providing stability; a taper sleeve; a motor located adjacent the taper sleeve; and a toothed-belt drive between the motor and the taper sleeve for driving the taper sleeve.

15 Claims, 8 Drawing Sheets

LIFTING MEANS FOR LABORATORY APPARATUS WITH STAND PROFILE AND BASE PEDESTAL AS WELL AS LABORATORY HEATING BATH, IN PARTICULAR FOR ROTARY EVAPORATORS

The present invention relates to a lifting means for laboratory apparatus with stand profile and base pedestal and with a supporting element to be raised and lowered which is movable along a stand, which supporting element is provided with means for holding it fast and with actuating means for moving said supporting element, as well as a laboratory heating bath, especially for rotary evaporators.

In the case of rotary evaporators, rapid lifting devices serve to accommodate glass fittings for the evaporation and condensation of substances, to lift heating baths, mixers, laboratory stirrers, and the like.

In most cases, it is necessary that raising and lowering be performed rapidly, without effort, safely, i.e. without tilting or lifting the lifting device itself, and above all with one hand. With regard to operation, ergonomics and safety, stringent requirements are imposed on such lifting means, above all when they are to be used in a versatile fashion. Today many processes or operations in the laboratory are controlled and monitored by microelectronics. The lifting means must also be capable of being included in this process. For these reasons, a versatile and modern lifting means must fully satisfy the safety requirements and regulations, from simple to process-controlled applications.

Such a versatile lifting means, which satisfies the requirements for rotary evaporators and as a general laboratory lifting means and is simultaneously designed for manual operation and as motor drive, is not known up to the present.

There has, however, become known a height-adjustable stand, especially for rotary evaporators, with a base pedestal and with a holding device slidable along a roughly vertical stand rod and fixable on said stand rod by means of a catch. This device, with regard to its function in the supporting element, serves for the mounting of glass apparatus and of a drive unit or the like. The holding device is so connected to a mechanical means of energy storage that when the catch is released said holding device can be lowered against the force of the energy-storage means or raised with the support of the force of the energy-storage means. With this construction, a spring is used as means of energy storage, which spring, in principle, can be both mechanical as well as pneumatic.

For the purpose of energy reduction in this height-adjustable stand, there is a mechanical means of energy storage in the form of a torsion spring arranged in a cable drum which is connected to the holding device by exposed tension means. By the installation of a geared motor with the energy-storage means, this system can also be operated by motor.

Because of the direct coupling of the holding device with the mechanical energy-storage means, i.e. without supplemental lever transmission, this embodiment is suitable only for relative small lifted weights (max. 8 kg). Very often, however, rotary evaporators also have glass attachments that are substantially heavier. In these cases, the operation of the stand is unpleasant, since there is then a danger of lifting or tilting the whole apparatus.

By virtue of the motor drive provided with this height-adjustable stand, the openly accessible tension means are driven by the mechanical force accumulator. The lifting system is therefore lowered only under its own weight. In other words, no compulsory force acts on the device during lowering. This is disadvantageous above all in case of severe contamination or with large weights to be shifted that act on the device. The so-called "stick-slip" effect then manifests itself, upon the occurrence of which the functional safety of the stand is no longer insured. (European Patent Application 0149972)

The prior art further includes a device for holding *vacuum evaporators at a variable height above a baseplate. In this device, in order to provide for the stable, automatic holding of the vacuum evaporator at variable height, said vacuum evaporator is supported by a swing lever connected indirectly or directly to the baseplate. This lever is electromechanically or pneumatically, or rather hydraulically, swingable between two end positions in both directions of swing and can be held fast in the swung positions.

That device is not a lifting means with a stand profile and a base pedestal. That device can be used exclusively for the adjustment of vacuum evaporators, especially as are used in laboratory apparatus, only a linear movement in a predetermined vertical plane being executable because of the given lever system. For general laboratory purposes, however, such a linear movement is not sufficient. There is needed, in addition, a capability of movement in a plane, a movement that this known device cannot achieve. (European Patent Application 0156937)

With regard to the prior art, there has further been mentioned a tripod stand in which, by means of a spindle, an elevating device can be displaced in height in order thereby to lift heavy loads, such as automobiles and the like. Such a stand is not usable for the present purposes. (U.S. patent application Ser. No. 2,774,567)

The present invention therefore has as its purpose the creation of a lifting means, especially for rotary evaporators as well as elevating platforms for laboratories, which lifting means operates rapidly and safely, in particular with greater stability with otherwise equal dimensions, and does so even under highly variable loads.

Such a lifting means is characterized by one of the Claims.

The invention will be described below in more detail with reference to a drawing, in which.

Figure 1:
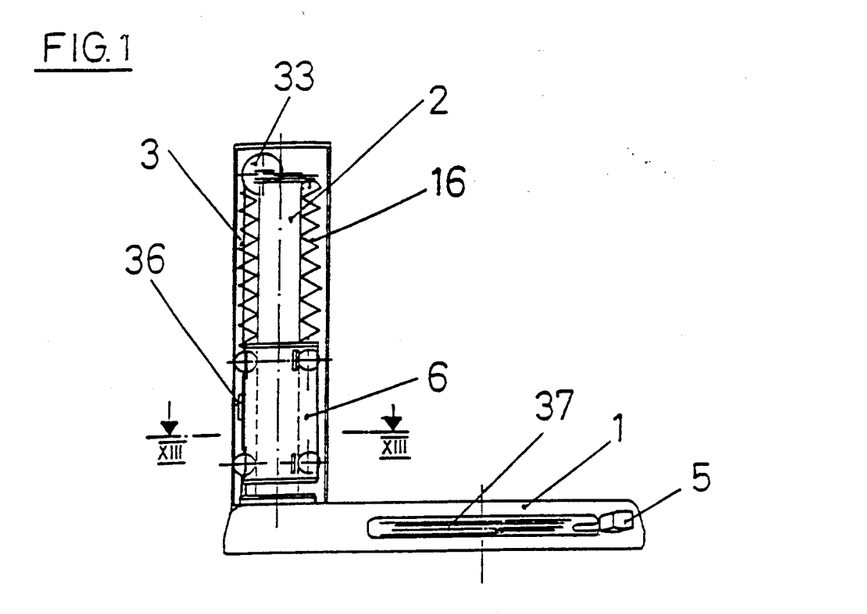
FIG. 1 is a side view of a laboratory lifting system with base pedestal and stand profile, with cover partly removed.
Figure 2:
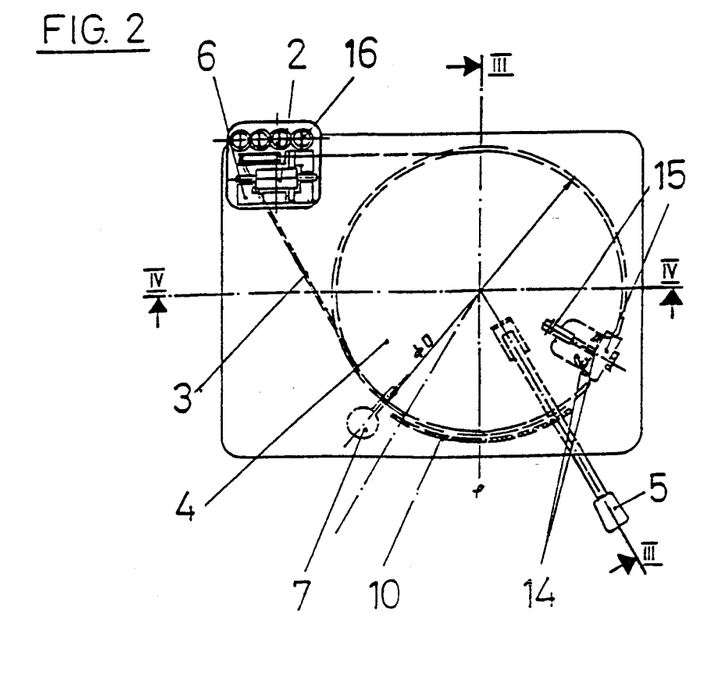
FIG. 2 is a plan view of the stand in accordance with FIG. 1, with the cover of the stand column removed and with a showing, in dashed lines, of the parts of the lifting means in the region of height of the base pedestal.
Figure 3:
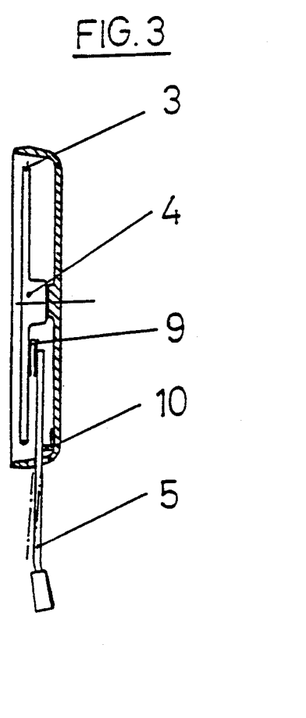
FIG. 3 shows a section along section line III—III of FIG. 2.
Figure 4:
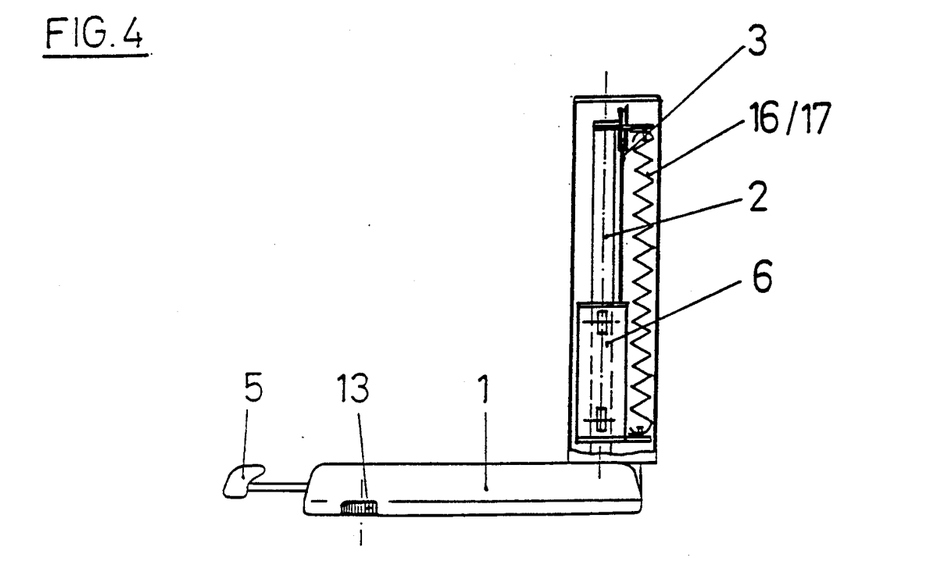
FIG. 4 shows the stand in accordance with FIG. 1, turned 90°.

The stand illustrated in FIGS. 1 to 3 exhibits a base pedestal 1 with stand profile 2 mounted thereon. Through a tension means 3, which here has a cable, a carriage 6 guided on rollers on the stand profile 2 is movable up and down. The carriage 6 is connected to a flywheel 4; it can also be other than a wheel-shaped mass of large moment of inertia, for example in the shape of a circular sector, which mass is provided with a swing lever 5. By means of the elongated swing lever 5, which in this case is fastened on the flywheel 4 and, protruding from a slot 37 in the base pedestal 1, can be swung in at least approximately the horizontal plane, the flywheel 4 is moved through an angle of swing $\phi$, which corresponds to the travel of the carriage 6. The carriage 6 is connected to the flywheel 4 with an externally covered tension system which comprises a cable 3, said flywheel 4 being mounted horizontally swingable in the base pedestal 1. By this arrangement, ideally the entire base surface of the base pedestal 1 can be utilized by the tension system. In this way, the flywheel 4, which serves the drive, can be dimensioned very large in diameter, so that the circumferential forces acting on said flywheel 4 are then small. Furthermore, the large gyrating mass of this flywheel 4 has a favorable effect. With the help of a set of springs 16 tensioned in this position, the tension system is set in motion, further accelerated, and again braked. Thus the entire lifting arrangement becomes exceedingly easy-running and flexible over the whole range of the angle of swing $\phi$ of the lever 5. The large mass of the flywheel 4 also results in a low center of gravity of the entire lifting means and thereby an enhanced stability.

Consequently, force transmission from the drive wheel to the carriage 6 can take place in a particularly simple fashion if the drive wheel 4 is formed by a closed system of tension means as a cable 3, chain, or tension tape. The exceedingly large wrap angle of the drive wheel 4 and the cable tension system aid in allowing even large loads on the lifting system to be moved positively in either direction and without slip.

The large diameter of the flywheel 4 favorably influences the turning angle $\phi$ of the flywheel 4 for the travel of the carriage 6, which turning angle also corresponds to the angle of swing of the swing lever 5 and thus is determined, in its maximum value, by the length of the slot in the plate 1. If the radius of the flywheel is R, then the angle $\phi$ must be selected such that $R \cdot \phi$ approximately corresponds to the travel of the carriage 6. By means of an elongated lever 5 which protrudes from the flywheel 4 out of the base pedestal 1 through the slot 37, the requisite driving force for the movement of the carriage 6 is correspondingly reduced in accordance with the lever rule.

The gyrating mass of the flywheel 4 can be increased by attaching a supplemental mass body 7, for example to the swing lever 5, as can be seen in FIG. 2. A U-shaped leaf spring 9 connected to the flywheel 4 is fastened by its free end to the swing lever 5 and tries to press said swing lever upward. The lever 5, by a toothed segment mounted on it, engages in toothing 10 which is mounted in the base pedestal 1 in the manner illustrated in FIG. 3. In this way, the flywheel 4 in rest position and, with it, the carriage 6 are blocked by the engagement of the toothed segment in the toothing of the segment 10 on the base pedestal 1. The attachment of the supplemental mass body 7 in the peripheral zone of the flywheel 4 or on the swing lever 5 itself makes it possible in each case to attain the end position with the swing lever 5 in a sweeping or exceedingly easy manner, as a result of the flywheel effect. Thus, by pressing downward and swinging the swing lever 5, i.e. without supplemental operation of a ratchet or another mechanical latch by a manual operation, the carriage 6 is brought to the desired position. By pressing down, swinging and releasing the swing lever 5, the system is set in motion or stopped again in a particularly logical operation.

Figure 5:
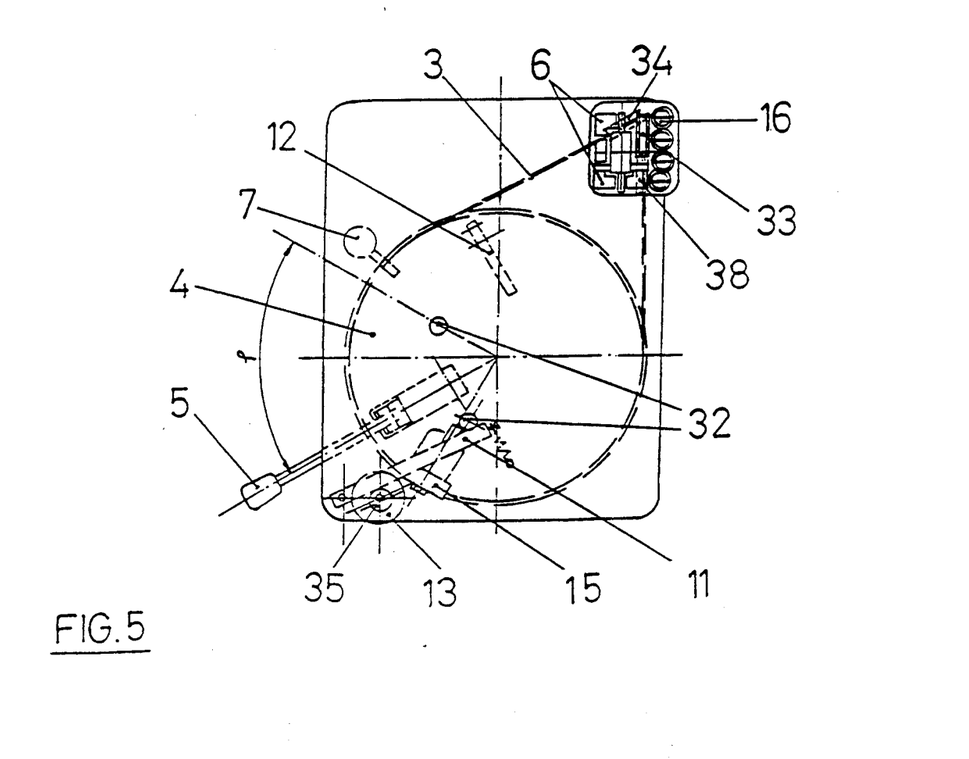
FIG. 5 is a view similar to FIG. 2, with components in part omitted and in part new.

As can be seen in FIG. 5, this embodiment exhibits an end stop 11, made as a swingable lever, as well as a fixed end stop 12 in the other end position. Here provision is made for swinging the end stop 11 about its axis of swing arranged in the region of the periphery of the base pedestal 1, by a manually actuatable setting wheel 13 via an attachment 35 eccentric to its axis of rotation. A spring indicated on the free end of the end stop 11 pulls said end stop to the attachment 35.

At the periphery of the swinging wheel or flywheel 4 there is a retainer 15 for the fastening of the two indicated cable ends 14 of the cable 3. This cable 3 runs in a groove in the flywheel 4 and, on leaving said groove, goes to a system of deflecting rollers. After passage of the cable 3 over the lower roller 34 and over the upper deflecting roller 33, the carriage 6 is fastened to the cable 3 at 36 by means of appropriate clamping means, and then the end of said cable is led further, over a lower deflecting roller 38, back again to the groove in the flywheel 4. The end 14 of said cable is fastened opposite the other cable end 14 in the retainer 15, so that an elevating system, closed in itself, is obtained for the carriage 6. The cable 3 is wrapped around roughly 270° of the flywheel.

In many applications, the lifting means must be capable of being limited in its travel. Here this can be achieved in a simple manner by altering the turning angle $\phi$ of the flywheel 4 by adjusting the end stop 11 on the base pedestal 1 by turning the setting wheel 13.

The fastening of both cable ends 14 to the flywheel 4 by means of the retainer 15 and an appropriate prestressing device, as is generally known for the tensioning of wires, results in a simplification of the design. Thus conventional cable stressing elements, such as spring-loaded swing levers with rolls, can be dispensed with, and a completely slip-free, compulsory raising and lowering of the carriage 6 can be assured.

For easier starting and stopping, a set of tension springs 16 is directly coupled with the supporting element 6. In this way, the swing lever 5 can be moved in an exceedingly sweeping and easy manner. Upon lowering the carriage 6, the weight of said carriage helps to reduce the operating force of the lever 5, with simultaneous stressing of the set of springs 16. The spring ends are fastened to the carriage 6 and to the stand respectively. These springs are easily accessible and therefore easily replaceable or adaptable.

It is, naturally, also possible through appropriate design to use a set of compression springs instead of a set of tension springs.

Figure 6:
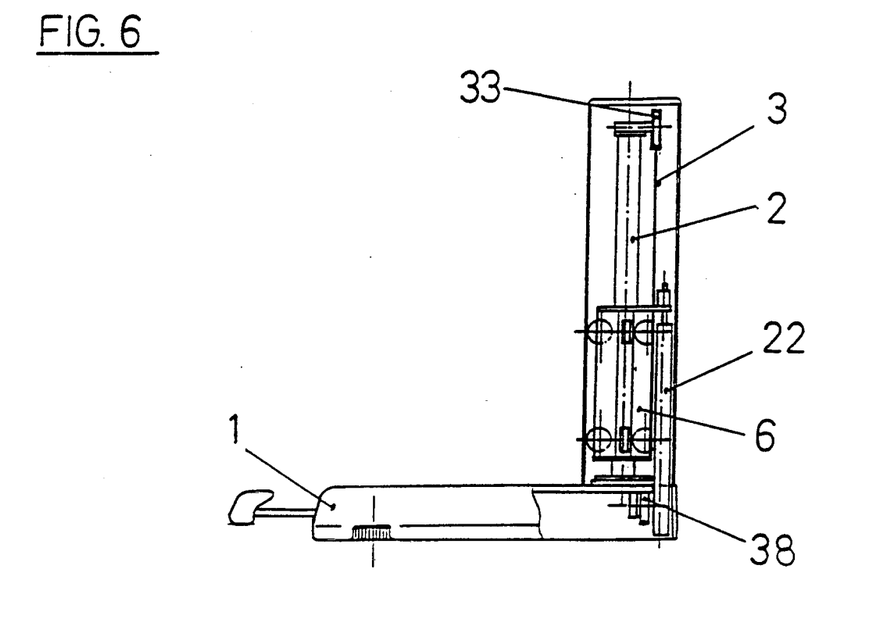
FIG. 6 is another embodiment, in a representation similar to FIG. 4.
Figure 7:
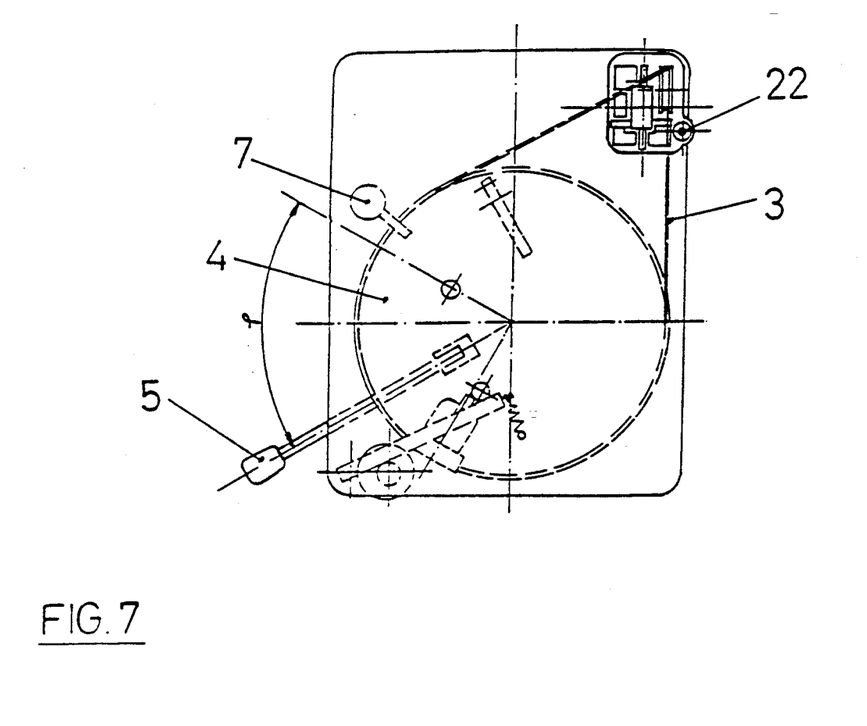
FIG. 7 is a showing of the embodiment in accordance with FIG. 6.

Another possibility would be to use a pneumatic spring 22 instead of mechanical springs, said pneumatic spring advantageously being arranged parallel to the stand profile and fixed on the supporting element (FIGS. 6 and 7).

Figure 8:
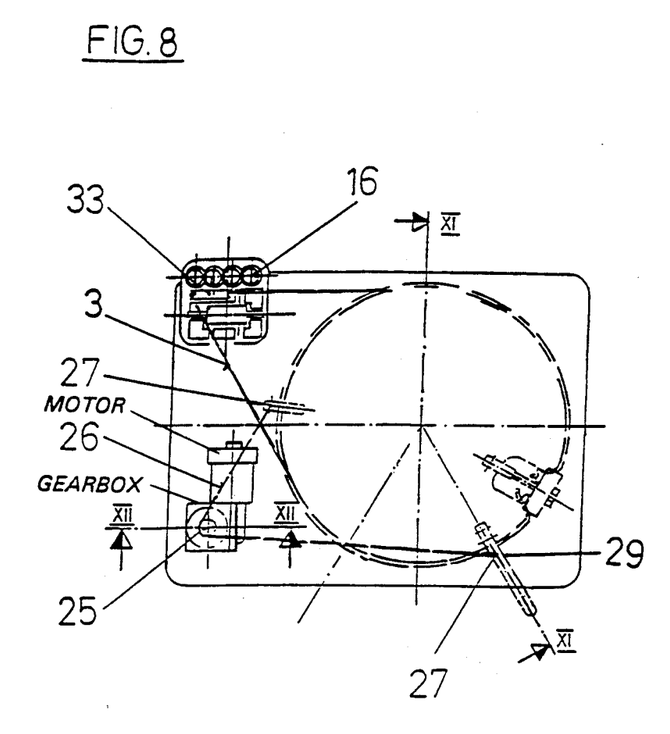
FIG. 8 is a plan view of a further embodiment of a stand, in a showing similar to FIGS. 2 and 7, with supplemental motor drive.
Figure 9:
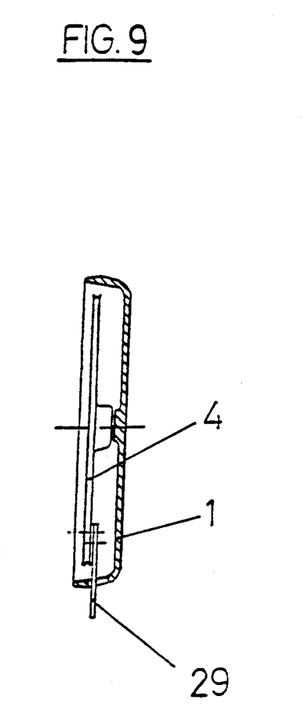
FIG. 9 shows a section through the device along section line XI—XI of FIG. 8.
Figure 10:
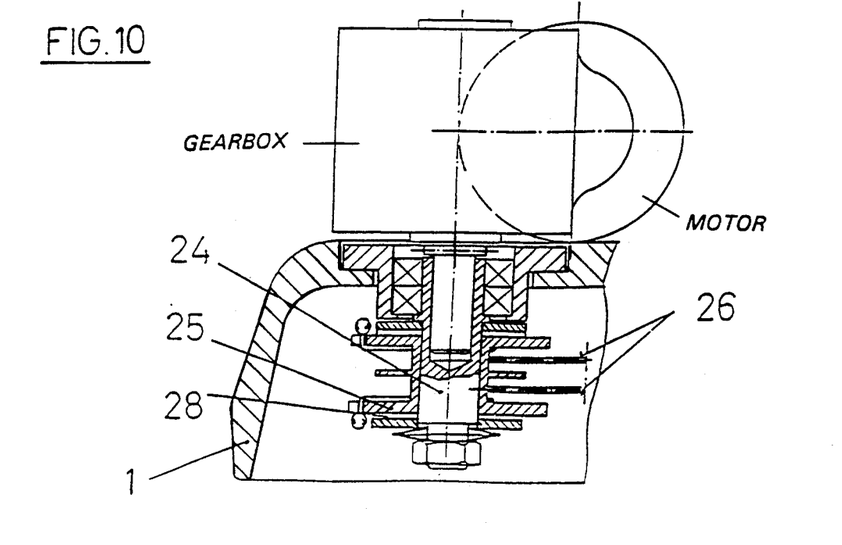
FIG. 10 is a cutaway view of the base pedestal of the embodiment of FIG. 8, along section line XII—XII.

In FIGS. 8 to 10 there can be noted an embodiment that has available a supplemental motor-driven cable drive 26. The cable is connected to the flywheel 4 at two points. The cable ends 27 of the cable drive are fastened one end to the swing lever 5 and at the other end to clamps provided for this purpose on the flywheel 4. In this way, the flywheel 4 is driven with the help of a geared motor. The flywheel 4 is thus swingable through the total angle of swing $\phi$. The geared motor is connected by a shaft 24 to a cable reel 25. It can be moved in both directions of rotation. If the cable is double-wrapped, slip-free drive is achieved. This has a particularly advantageous effect on the drive force to be applied, due to the favorable lever ratios, i.e. the diameter of the small cable reel 25 and the diameter of the very large flywheel 4. This insures an outstanding force-transmission factor. In this way, the small drive motor can be installed in the most restricted space and, indeed, on the same base surface as the manually operated device. This is important, in particular, with laboratory apparatus where the base area taken up by the apparatus is exceedingly limited. In this way, a very compact construction is achieved, even with the motor-driven device. With regard to saftey, the motor drive unit is connected to the cable reel 25 through a limitable torque clutch 28. In this way, in case of power outage, the system can be manually placed in rest position, i.e. taken out of the danger zone, with the help of an auxiliary lever or emergency lever 29 which is connected, instead of the swing lever 5, to the flywheel 4.

With a fixed limit switch for the rest position on the end stop 12 and an adjustable limit switch for the working position on the end stop 11, the system can be operated throughout the required range of travel in a danger-free and fully automatic manner via a system of control electronics (not shown). By simple adjustment of the one end stop 11, the limit switch can be placed very quickly in the desired operating position in the manner mentioned, by using the adjusting wheel 13 with the eccentric 35, which adjusting wheel is rotatably connected to the base pedestal 1, to move or swing the swing lever 11, which is pressed against the eccentric 35 by the tension spring. The end stop in each case results from two cams 32 arranged on the flywheel 4 (FIG. 5).

By the quadrilateral profile chosen for the stand profile 2, all torques generated on the carriage 6 by loads are borne by the four guide surfaces, i.e. relatively large torques are intercepted by the guide profile 2 without additional guidance.

Figure 11:
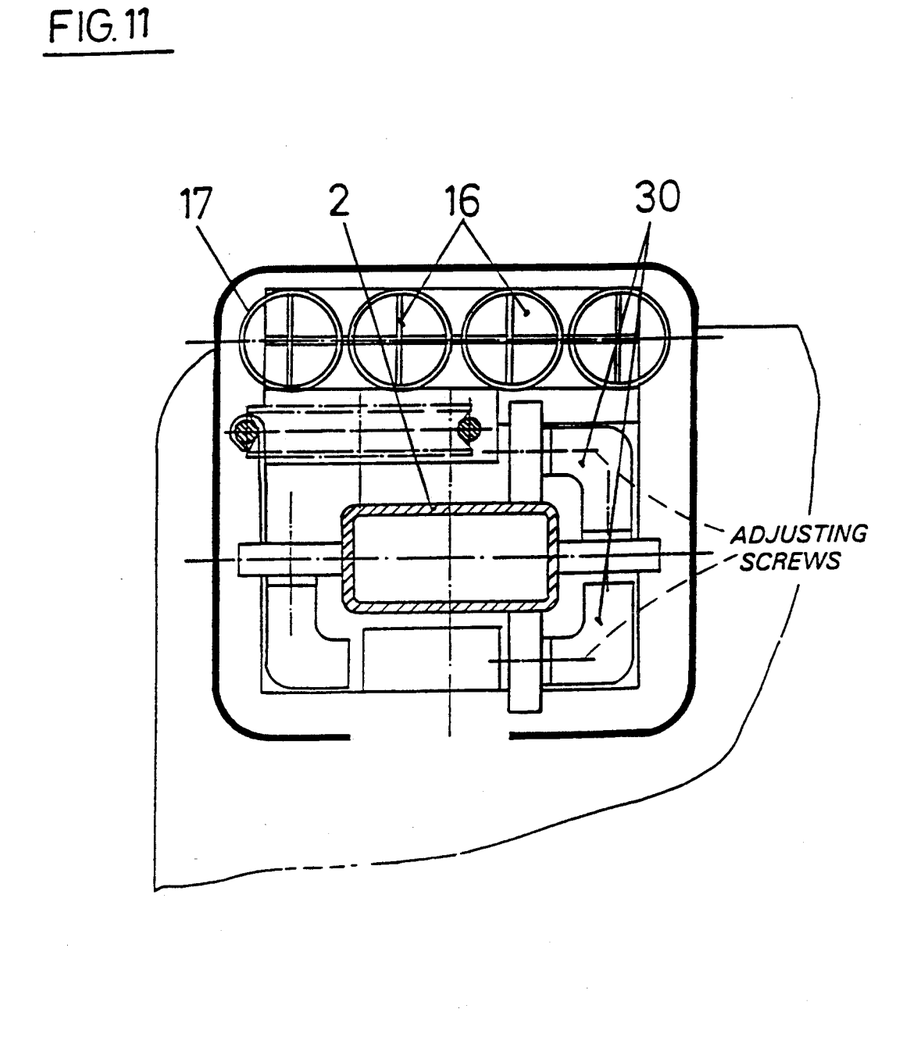
FIG. 11 shows a section through the embodiment of FIG. 1, along section line XIII—XIII.

By the special design, the carriage 6 can easily be adjusted relative to the guide profile 2 without play, by sliding a guide profile 30 against the guide profile 2 in each of the two axes X and Y, said guide profile being movable and provided with adjusting screws (FIG. 11).

The illustrated profiles, corresponding to the stand profile 2 for adaptation to the carriage 6, are visible in FIG. 11.

Figure 12:
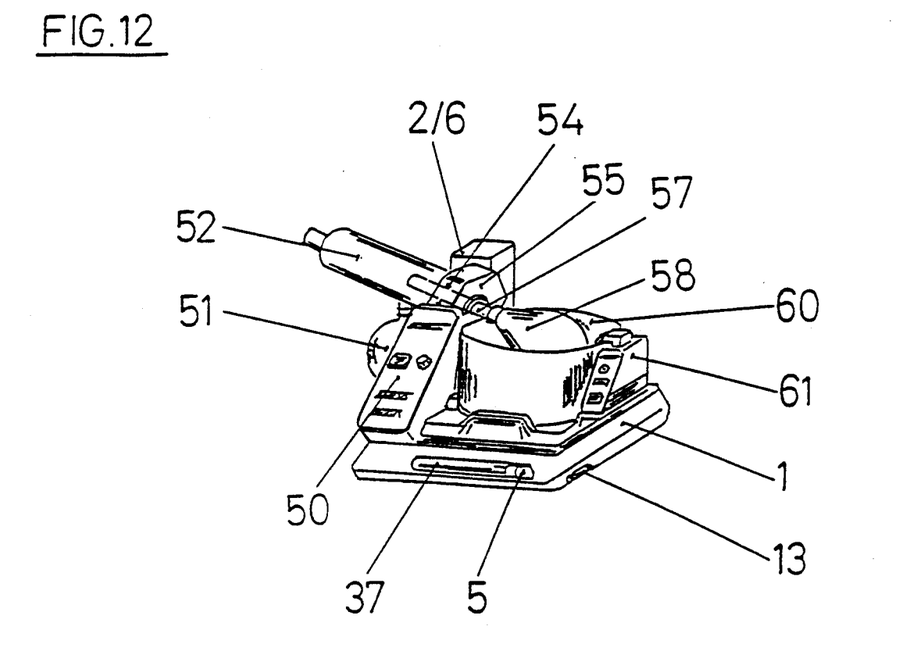
FIG. 12 is a perspective view of a rotary evaporator unit, from the front, without glass shield.

FIG. 12 shows diagrammatically a rotary evaporator unit with its most important components. A system of drive electronics 50 can be noted, as can a distillation flask 51 and a distillation cooler 52. There are furthermore shown a vacuum seal 54 for the vapor tubing 57 and, on the end of the rotating vapor tubing 57, a rotating evaporator flask 58. Standing on the base pedestal 1 is a water or oil bath container 60 with a heater holder 61.

Figure 13:
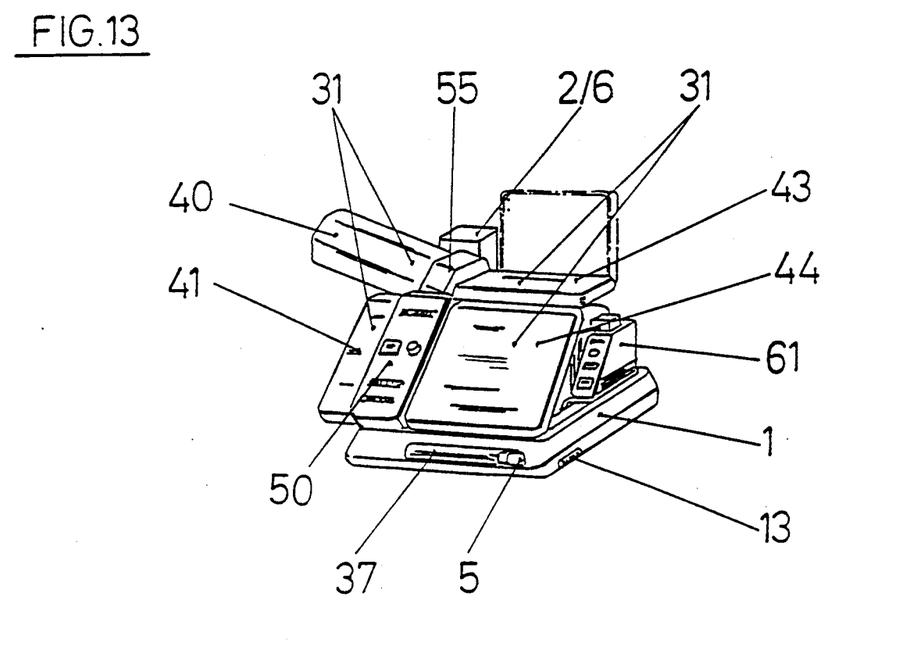
FIG. 13 is a perspective front view of the unit of FIG. 12, with glass shield and with lifting means in accordance with the invention.

FIG. 13 shows the unit of FIG. 12, but provided with a glass shield. This comprises a distillation cooler shield 40 as well as a distillation flask shield 41. A further hinged shield 43 is provided for the evaporator flask, as is a heating bath shield 44 for the water container or oil container. All these shield devices, preferably consisting of transparent plastic, in particular of Plexiglas, are individually movable, for example hinged on the elevating carriage or on the components mounted on the elevating carriage or the pedestal.

In order to allow safe operations, it is desirable to use so-called glass shield elements, as are visible in FIG. 13, and to place these in the desirable position corresponding to the mode of functioning of the unit. In this sense, the placement of the drive mechanism for the rotary evaporator in the base pedestal 1 also proves very advantageous as to safety, since the needed shield devices, such as Plexiglas panes, screens and the like for the glass components and heating baths can be placed and mounted above the base pedestal 1 in a compact, simple and enclosed fashion.

On the functioning of the rotary evaporator:
First the parameters
boiling point/vacuum
flask rotation speed
are adjusted for the substance to be distilled.

When all the parameter values that were set have been reached, the evaporator flask is advanced into the water bath by means of the rapid lifting system described.

This process (advancing/retracting) must be repeated often in accordance with the degree of difficulty of the distillation (strongly foaming substances, for example).

For this reason, the lifting system must operate rapidly and cleanly, safely, and easily, even under highly variable load.

When the distillation is in progress, forced convection is produced in the distillation solution by the rotation of the evaporator flask. The heat transfers
bath/flask
flask/distillation solution
are substantially improved by this effect.

After the completion of the distillation, the evaporator flask is again retracted from the water bath.

To replace or clean the evaporator flask, the glass shield on the evaporator flask can be opened.

The glass shield as a whole is designed in such a way that it represents no obstacle in operation but essentially represents great safety for the operator.

In this way, trouble-free operation and handling are achieved even with the shield devices mentioned.

For laboratory elevating platforms, the same concept likewise has an exceedingly positive effect, since in this way the working platform is usable and accessible in the entire base area, i.e. without interfering effects due to the drive mechanism, levers, handles and the like. The platform can be removed from the danger zone by means of the swing lever 5. Furthermore, the center of gravity of the lifting system is likewise very positively influenced by the orientation of the mechanism in the base pedestal 1; i.e. tipping or lifting off of the device is made quite impossible in this way. The operation of the swing lever 5 is very desirable from the ergonomic standpoint. Because the actuation of the lever 5 takes place exclusively in essentially the horizontal plane at the level of the base pedestal 1, it is of no importance how tall the operating person is.

What is more, the drive mechanism 4, 5 of the lifting system must not impair the accessibility of the corresponding application purpose; i.e. the drive system of the lifting stand as well as the drive lever must be placed outside the working area. Thus optimal safety can also be insured. Finally, the system is also to be capable of use for automated purposes. All these requirements are satisfied by the lifting system described.

The water bath or oil bath illustrated in FIG. 12 is one of the laboratory heating baths that heat the substance to be distilled in rotary evaporators. Furthermore, these heating baths are used in a versatile manner for general heating purposes and for holding constant a set temperature. Because of this versatility in the applications, stringent requirements are imposed on the handling of the heating apparatus, above all with regard to mobility, ergonomics and safety, since this apparatus must be repositioned very often for heating or cleaning purposes.

The disadvantage of the known laboratory heating baths consists, in particular, in that the carrying elements are attached in an exceedingly defective fashion and actually are completely lacking on most baths. In this way, this repositioning can be exceedingly dangerous for the user, above all with heated liquid.

Therefore it is also a purpose of the invention to avoid the disadvantages of the prior art and, in particular, to create a laboratory heating apparatus that can be handled safely and rapidly.

In accordance with the invention, this purpose is achieved by the fact that the base pedestal as supporting pedestal is provided with handles, the heater holder with heater and thermostat preferably being arranged next to the container on a widened handle surface. By this arrangement, as can be noted, the heating bath can be grasped or repositioned in any position.

For reasons of cost, many heating baths have a permanently integrated heater in the heating medium. The most serious disadvantages of this type of solution are the cleaning of the bath itself as well as the sealing of the heating element through the liquid container, because of aging of the seal elements. Therefore it is also a purpose of the invention to avoid these disadvantages.

Figure 14:
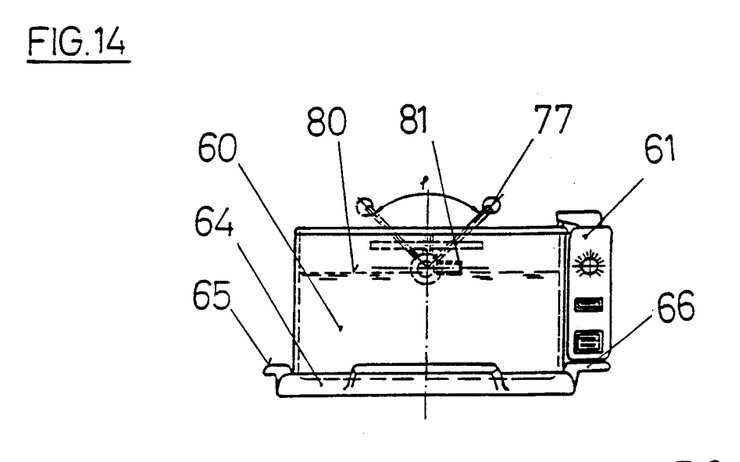
FIG. 14 is a cutaway view of the front of a rotary evaporator unit similar to that of FIG. 12.

As FIG. 14 shows, on a widened base surface of a handle 66 of the supporting pedestal 64, a heater holder 61 with immersion-boiler heater 73 is mounted parallel to the liquid container, via a guide 68 in the housing of the heater holder 61, on two guide pins 67 on the base surface of the handle. In this way, the heater holder 61 can be easily and quickly removed with a grasp of the hand. The arrangement of the heater holder on a widened base surface of a handle 66 lends an exceedingly compact construction to the heating bath 60. By the ease of replacement of the heater holder 61, an electronic version of the heater holder with digital temperature display can be used instead of the standard heater holder with thermostat and temperature limiter.

In a further version, the heater holder 61 can also be provided with a stirrer for the heating medium. This is important, above all, when stringent requirements are imposed on the constancy of an exact temperature. A stirrer shaft 71 is guided on an extended rotating arm 69 on the housing of the heater holder 61 and is driven by a small electric motor 70 in the housing of the heater holder 61, by a toothed belt 72 or a flat belt drive.

Laboratory heating baths must have a means of adjusting the liquid level, above all in the case of rotary evaporators. Conventional means of this type have the disadvantage that they can be operated in a difficultly accessible manner and are difficult to operate, above all in the scaled condition. Because of the poor access, the user is also threatened by a great danger of combustion.

Figures 15, 16, 17:
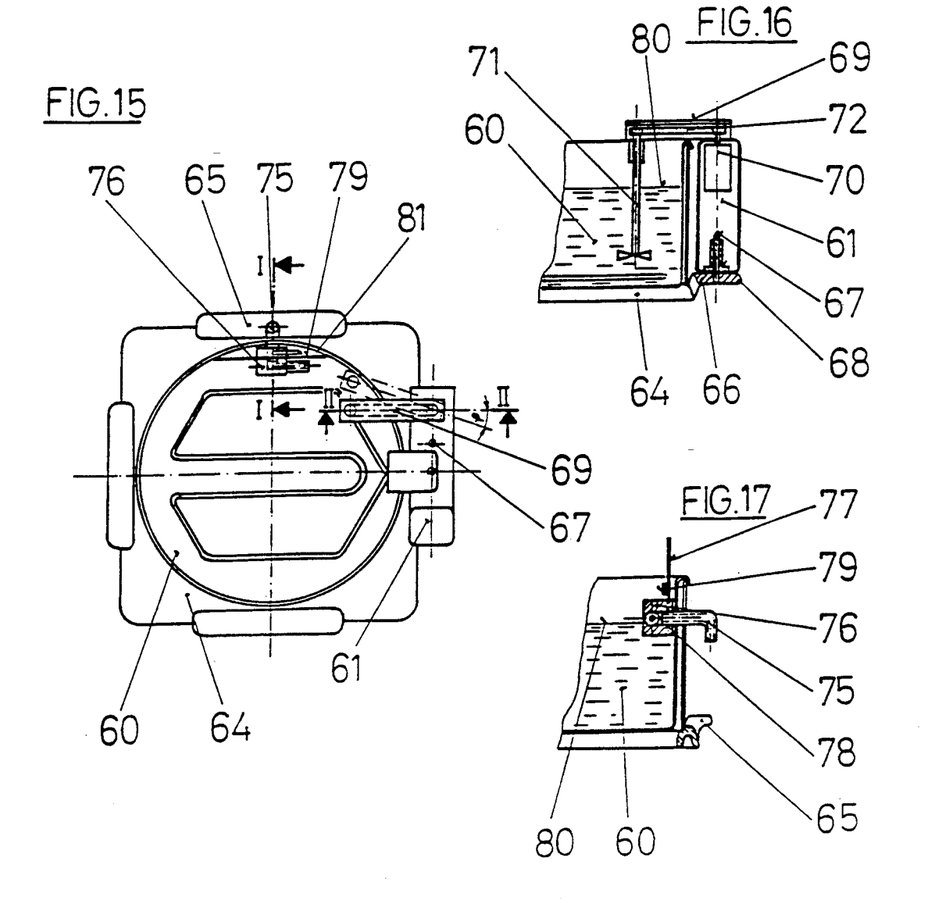
FIG. 15 is a plan view of the unit in accordance with FIG. 14.
FIG. 16 is a cutaway view of a detail of FIG. 15, partly sectioned along line II—II of FIG. 15.
FIG. 17 is a cutaway view of a detail of FIG. 15, partly sectioned along line I—I of FIG. 15.

Therefore it is also a purpose of the invention to eliminate these disadvantages. This is achieved in an especially advantageous fashion by the fact that an element 76 (FIGS. 15 and 17) on a radial drain tube 75 which is attached to the container 60 at the lowest liquid level 80 can be swung by means of a supplemental operating lever 77. The element 76 has a drainage tube stub 81 in order to conduct liquid from the liquid level 80 of the heating bath to the permanently attached drain tube 75. In this way, by altering the angle of swing of the element 76, the liquid level 80 can be regulated by changing the height of the opening of the stub 81. By means of the long operating lever 77, swinging of the element 76 is still readily possible even in the severely scaled condition of the heating bath. In order to reduce the leakage rate to a minimum, the rotating element is provided with a simple O-ring seal 78. During swinging, the operating lever 77 is guided by a web 79 on the container so that the element 76 cannot slide away from the drain tube 75.

In the case of the rotary evaporator of FIGS. 18 to 21, the rotary drive 55 rotates the evaporator flask 58 with the vapor tubing 57. Here it is of the utmost importance that the drive operates noise-free, vibration-free and as loss-free as possible, i.e. at a high efficiency.

Figures 18, 19:
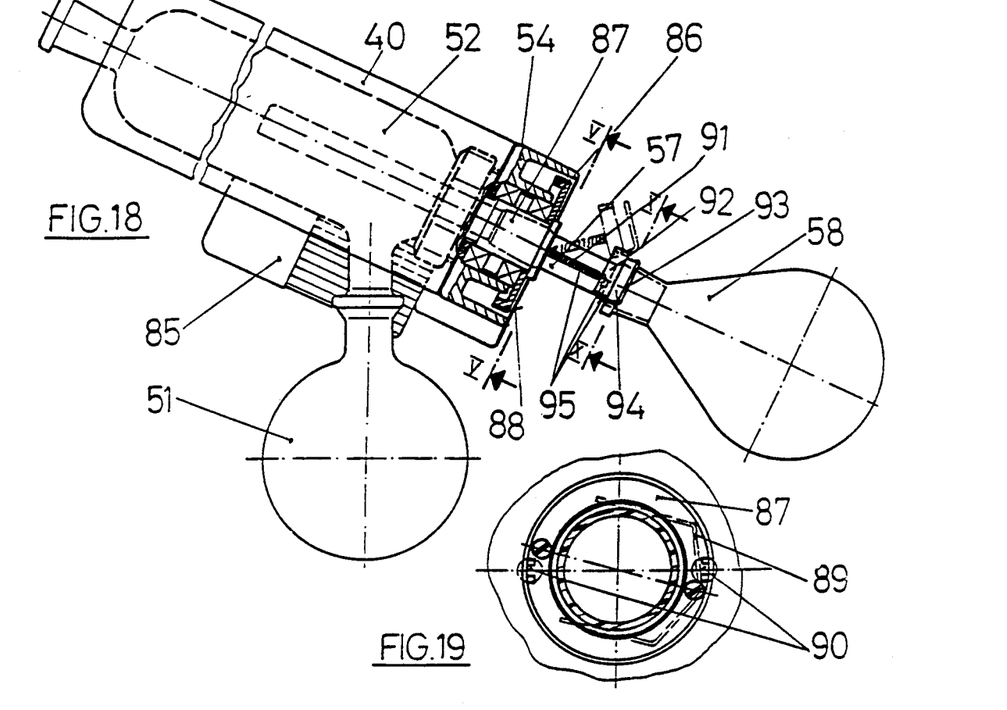
FIG. 18 is a side view of a rotary drive, with cutaway portions, in accordance with FIG. 12.
FIG. 19 shows a detail along section line V—V of FIG. 18.
Figure 20:
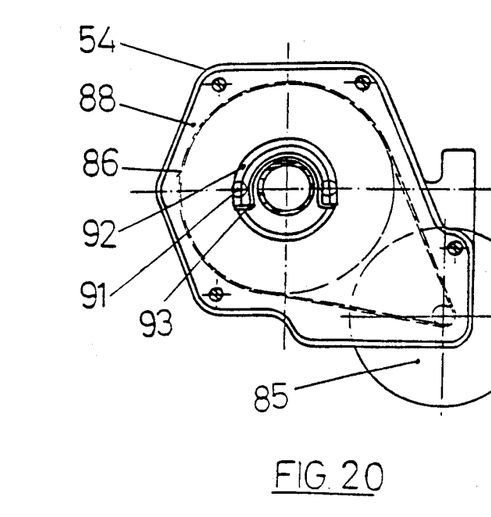
FIG. 20 is a section along section line X—X of FIG. 18.

Conventional rotary drives operate by means of worms and worm gears, which are driven by an electric motor. This type of design, however, requires exceedingly precise engagement of worm and worm gear. What is more, for trouble-free running, the worm should be supported at both ends. But this is time-consuming and costly. For these reasons, the conventional drives are supported at only one end. In this way, these drives generate relatively intense noise in operation and have a high loss factor due to their poor efficiency. What is more, these drives require a high degree of manufacture. Therefore it is a purpose of the invention to create and make possible a drive that avoids the disadvantages mentioned. By the special arrangement of the lifting means 1 and the stand 2 and in the additional improvement of the center of gravity, the motor 85 can be set parallel to the distillation cooler 52. In this way, the motor 85 can be placed on the back side of the apparatus in an optically practically invisible fashion. Force is transmitted via a toothed-belt drive 86 to a taper sleeve 87. Toothed-belt drives run with low noise, are insensitive to tolerances, and operate in an absolutely slip-free manner. The further advantages are high efficiency, which is approximately 30% higher than with worm and worm gear, long service life, and easy installation and removal due to the especially favorable design and accessibility of the drive housing 54. By removal of the cover 88, the entire path of the toothed-belt drive 86 is exposed and thereby allows good accessibility.

The taper sleeve 87, also often called a hub, accepts a vapor tubing 57 or vapor passage tube. By means of a conical ground-glass joint 94, the evaporator flask 58 is accommodated on said tube, which evaporator flask is fastened, in known drives, to the vapor tubing 57 by means of a spring closure. Because of the highly variable tolerances in the various glass components, these types of closure, which perform the holding function exclusively as a result of the contour of the glass components, bring serious problems with them, above all because the entire drive system is inclined at 25° along with the glass components concerned and, furthermore, the loading of the evaporator flask varies greatly because of the volume of the substance. For this reason, the holding function of these closure systems is no longer assured with reliability, above all in the case of heavy loading of the evaporator flask.

Thus there must be found a closure system that functions largely independently of the tolerances of the glass contours and assures the user of high reliability in operation in every case.

Figure 21:
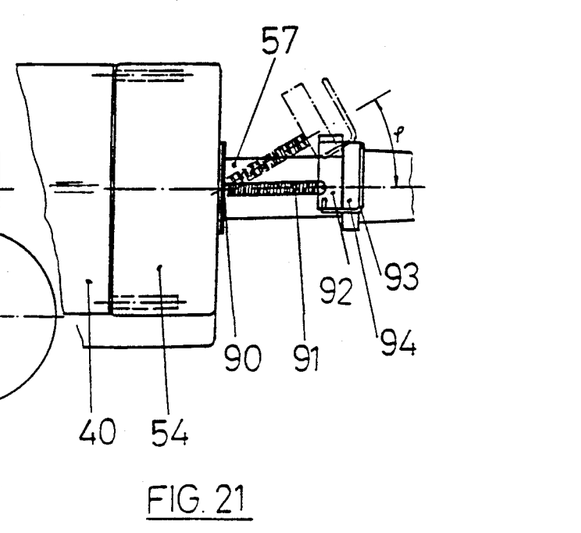
FIG. 21 is a cutaway view of a detail of the rotary drive in accordance with FIG. 18.

In accordance with the invention, this problem is solved by the fact that the taper sleeve 87 or hub has, at the inlet of the guide for accommodating the vapor tubing 57, a mounting means in the form of eyes, hooks 90 or mounting screws, which mounting means accepts tension springs 91 which are rotatably coupled to the taper sleeve at these eyes or hooks. At the other end of the tension springs 91, a handle 92 is connected to the springs 91. Attached to this, in turn, is a ball clip 93, which surrounds the flange of the evaporator flask 94. During the process of suspension and removal from suspension, the entire closure 95 can be swung through the turning angle $\phi_1$ at the hub, as a result of the mobility.

Thus there results a closure system that operates in a tolerance-free fashion and largely independently of the glass contours and insures reliable force transmission from the taper sleeve to the glass components or, respectively, the rotation. On the release of the closure, the vapor tubing 57 is held in the rest position by a small clamping spring 89 on the cone of the vapor tubing 57. Thus there is obtained a double closure system for the rest position and operating position.

I claim:

1. A lifting device for lifting a carriage, comprising:
   a base pedestal;
   a stand disposed above said base pedestal;
   a carriage; and
   lifting means for lifting said carriage along said stand, said lifting means comprising:
   a rotatable inertial mass disposed within said base pedestal;
   a movable actuating lever connected to said rotatable inertial mass for rotating said inertial mass; and
   connecting means for operatively connecting said carriage to said rotatable inertial mass, said inertial mass providing a means to lift the carriage when said rotatable inertial mass is rotated by the movable actuating lever.

2. The device of claim 1, wherein said pedestal has a slot, said slot having a toothing, said lever extending through said slot, the movement of said lever being limited by the length of said slot, said lever being fastened to said inertial mass by a spring which normally biases said lever into said toothing.

3. The device of claim 1, wherein said carriage is slidable along said stand, said device further comprising a spring for offsetting the weight of said carriage.

4. The device of claim 2, further comprising a fixed end stop and an adjustable end stop located on said pedestal, the turning angle of said inertial mass and the extent to which said carriage can be lifted being defined by said end stops.

5. The device of claim 4, wherein said adjustable end stop comprises a lever cooperating with an eccentric adjusting wheel.

6. The device of claim 1, wherein said connecting means comprises a cable, tape, or chain, said connecting means having two ends which are connected to and wrap around said inertial mass, said device further comprising means for adjusting the tension of said cable, tape, or chain.

7. The device of claim 1, further comprising a motor for rotating said inertial mass.

8. The device of claim 1, wherein said stand has a quarilateral profile, said device further comprising adjustable means for guiding said carriage along said stand without play.

9. The device of claim 1, further comprising removable glass shields.

10. The device of claim 1, wherein said inertial mass is a flywheel.

11. The device of claim 1, wherein said lever moves in a substantially horizontal plane, substantially parallel to a bottom portion of said base pedestal, to move said carriage.

12. The device of claim 11, wherein said inertial mass is a flywheel.

13. The device of claim 11, wherein said carriage has a range of motion along said stand, said range of motion being completely traversed by said carriage by rotating said inertial mass less than 360°.

14. The device of claim 1, wherein said carriage has a range of motion along said stand, said range of motion being completely traversed by said carriage by rotating said inertial mass less than 360°.

15. The device of claim 1, wherein said inertial mass has means providing inertial braking and motion-damping for said carriage.

* * * * *